(12) United States Patent     (10) Patent No.:   US 12,579,512 B2

Knight     (45) Date of Patent:    Mar. 17, 2026

(54) OPTIMIZATION OF ITEM AVAILABILITY PROMPTS IN THE CONTEXT OF NON-DETERMINISTIC INVENTORY DATA

(71) Applicant: Maplebear Inc., San Francisco, CA (US)

(72) Inventor: Benjamin Knight, Oakland, CA (US)

(73) Assignee: Maplebear Inc., San Francisco, CA (US)

( * ) Notice: Subject to any disclaimer, the term of this patent is extended or adjusted under 35 U.S.C. 154(b) by 265 days.

(21) Appl. No.: 18/136,513

(22) Filed: Apr. 19, 2023

(65) Prior Publication Data

US 2023/0351326 A1    Nov. 2, 2023

Related U.S. Application Data

(60) Provisional application No. 63/336,884, filed on Apr. 29, 2022.

(51) Int. Cl.
*G06Q 10/0875*      (2023.01)

(52) U.S. Cl.
CPC ............................... *G06Q 10/0875* (2013.01)

(58) Field of Classification Search
CPC .................................................. G06Q 10/0875
See application file for complete search history.

(56) References Cited

U.S. PATENT DOCUMENTS

| | | |
|---|---|---|
| 10,242,336 B1 | 3/2019 | Agarwal et al. |
| 2014/0279294 A1 | 9/2014 | Field-Darragh et al. |

| | | | |
|---|---|---|---|
| 2019/0236740 A1* | 8/2019 | Rao ................... | G06Q 10/06315 |
| 2019/0236749 A1 | 8/2019 | Gould et al. | |
| 2020/0219171 A1* | 7/2020 | Zhuang .............. | G06Q 30/0635 |

OTHER PUBLICATIONS

Fazri, "How Product Arrangement and Quantity Influence Consumer's Intention: The Role of Disliking Disorderliness and Scarcity Effects", 2017, Advances in Economics, Business and Management Research, vol. 36 582 (Year: 2017).*
Rao, "The Algorithms That Make Instacart Roll", 2021, https://spectrum.ieee.org/the-algorithms-that-make-instacart-roll, (Year: 2021 ).*
PCT International Search Report and Written Opinion, PCT Application No. PCT/US2023/19067, Jul. 31, 2023, 9 pages.

* cited by examiner

*Primary Examiner* — Allen C Chein
(74) *Attorney, Agent, or Firm* — Fenwick & West LLP

(57) ABSTRACT

A system receives a request for a set of items at a warehouse from a user device, and determines a set of candidate items responsive to the request. The system applies a trained item availability model to each candidate item to determine a prediction of a likelihood that the candidate item is available for pickup at the warehouse. A subset of candidate items that have a prediction below a threshold is classified as low availability. The computer system also determines a cap of low availability items to present to a user based on a user utility curve. The user utility curve is modeled based on user utility associated with amounts of low availability items presented. The low availability items are filtered to an amount within the determined cap. The filtered low availability items are sent to the user device for presentation in a user interface.

20 Claims, 9 Drawing Sheets

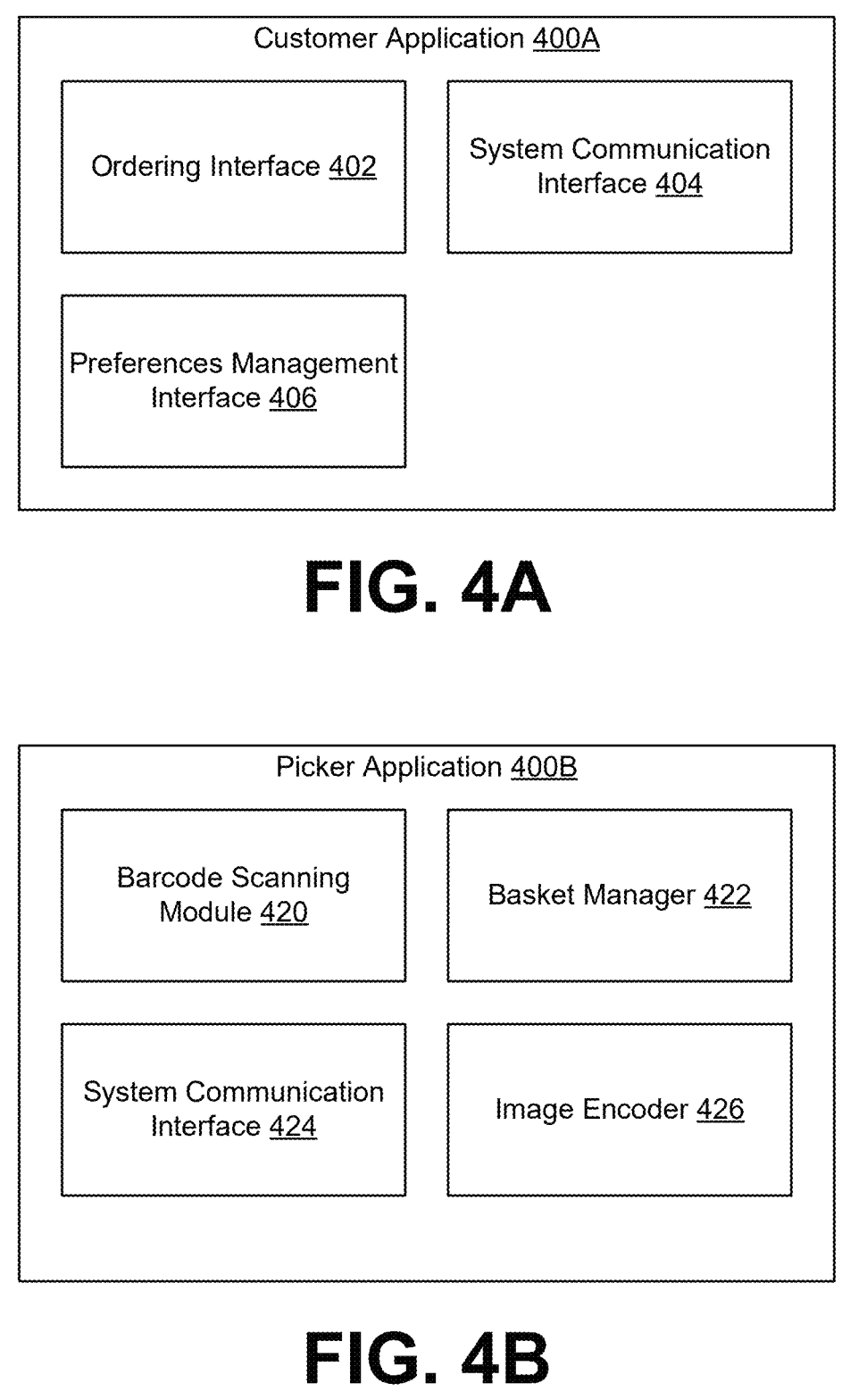

Customer Application 400A

Ordering Interface 402

System Communication Interface 404

Preferences Management Interface 406

FIG. 4A

Picker Application 400B

Barcode Scanning Module 420

Basket Manager 422

System Communication Interface 424

Image Encoder 426

FIG. 4B

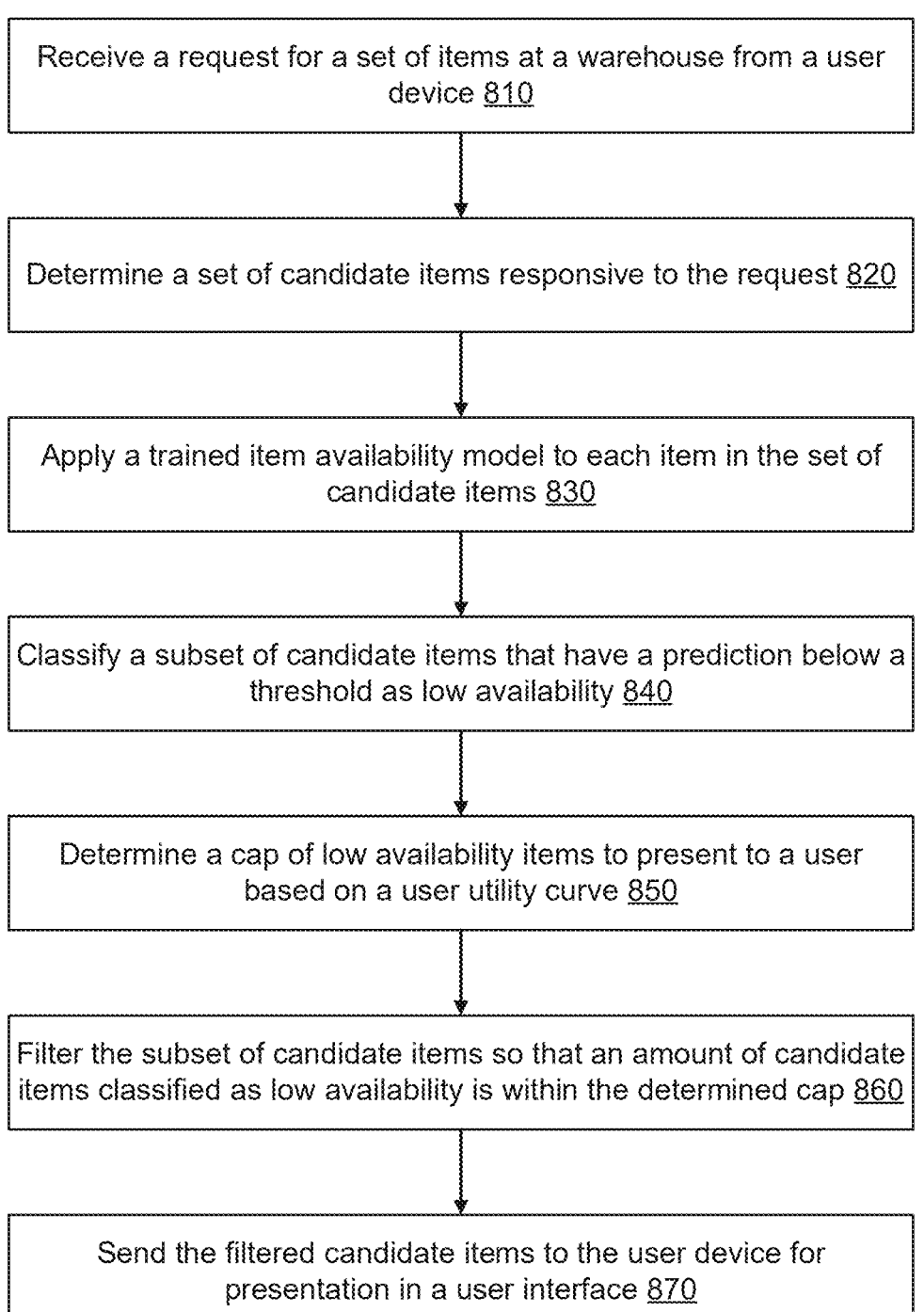

800

Receive a request for a set of items at a warehouse from a user device 810

Determine a set of candidate items responsive to the request 820

Apply a trained item availability model to each item in the set of candidate items 830

Classify a subset of candidate items that have a prediction below a threshold as low availability 840

Determine a cap of low availability items to present to a user based on a user utility curve 850

Filter the subset of candidate items so that an amount of candidate items classified as low availability is within the determined cap 860

Send the filtered candidate items to the user device for presentation in a user interface 870

FIG. 8

OPTIMIZATION OF ITEM AVAILABILITY PROMPTS IN THE CONTEXT OF NON-DETERMINISTIC INVENTORY DATA

CROSS REFERENCE TO RELATED APPLICATION

This application claims the benefit of U.S. Provisional Application No. 63/336,884, filed Apr. 29, 2022, which is incorporated by reference in its entirety.

BACKGROUND

In current online concierge systems, shoppers (or "pickers") fulfill orders at a physical warehouse, such as a retailer, on behalf of customers as part of an online shopping concierge service. An online concierge system provides an interface for a customer to identify items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

To simplify the selection of items for inclusion in an order, an online concierge system attempts to show users a maximum number of items offered by a warehouse for the order. Such a display of a comprehensive listing of items offered by a warehouse increases a likelihood of a user identifying one or more items for inclusion in an order. However, an online concierge system may have varying degrees of confidence that certain items are available at the warehouse at different times, and displaying items to a user that are low or not in stock at the warehouse complicates a user's ability to accurately and quickly identify whether an item is capable of being obtained from a warehouse when seeking to order the item through the online concierge system.

SUMMARY

An online concierge system allows customers to purchase items from physical stores and then delivers the purchased items to the customers. The online concierge system predicts whether items are available at a given store, and the user interface of the online concierge system lists items that are available and may also list items that have lower availability but still may be available. Showing some items with non-flattering information (such as low availability items) is good for users, but showing too many can diminish the user experience. To strike the right balance, the online concierge system caps the number of low availability items for which non-flattering information is shown (e.g., as a percentage of the total items in the search results). To determine the number of low availability items to use for the cap for how many low availability items to show, the system models a customer's perceived utility in the platform as a function of the low availability items shown, and then sets the cap at the point where that utility begins to decrease. Various proxies can be used to label the customer's utility, such as customer spending in a subsequent period, number of orders placed, etc.

In accordance with one or more aspects of the disclosure, an online concierge system receives a request for a set of items available at a warehouse from a user device, and determines a set of candidate items responsive to the request. The online concierge system applies a trained item availability model to each of candidate items, the item availability model outputting a prediction of a likelihood that the candidate item is available for pickup at the warehouse. The online concierge system classifies a subset of the candidate items that have a prediction below a threshold as low availability, and determines a cap of low availability items to present to a user based on a user utility curve. The user utility curve is modeled as a metric correlated with user utility as a function of an amount of low availability items presented. The cap is based on a local maximum of the user utility curve. The online concierge system filters one or more of the candidate items so that the amount of candidate items classified as low availability is within the determined cap. The filtered candidate items are then sent to the user device for presentation.

BRIEF DESCRIPTION OF THE DRAWINGS

FIG. 4A is a diagram of the customer application, in accordance with one or more embodiments.

FIG. 4B is a diagram of the picker application, in accordance with one or more embodiments.

FIG. 8 is a flowchart for a method of presenting a combination of available items and low availability items to a user, in accordance with one or more embodiments.

DETAILED DESCRIPTION

An existing online concierge system attempts to show users a maximum number of items offered by a warehouse for the order. Such a display of a comprehensive listing of items offered by a warehouse increases a likelihood of a user identifying one or more items for inclusion in an order. However, the online concierge system may have varying degrees of confidence that certain items are available at the warehouse at different times, and displaying items to a user that are not in stock at the warehouse complicates a user's ability to accurately and quickly identify whether an item is capable of being obtained from a warehouse when seeking to order the item through the online concierge system.

Based on extensive research and experiment, it is discovered that showing some or all of the low availability items may lead to a better user experience (balancing the chance of disappointment for not finding the items versus the possibility of obtaining an item that is desired). However, showing too many low availability items or too high a proportion of low availability items to a user may actually degrade the user's experience, in part, due to a lack of confidence in the online concierge system.

Users' experience may be measured by user actions subsequent to the amount of low availability items presented to the users. Such user actions may include (but are not limited to) an amount of items placed in an order, an user interaction with a low availability item (e.g., adding a low availability item in the shopping cart, selecting a replacement item for the low availability item placed in the shopping cart), etc.

In some embodiments, the online concierge system models the user's perceived utility of the service using a measurable metric that is expected to correlate with the users' perceived utility, such as the total amount of money spent in a subsequent period (subsequent to the presentation of a user interface with a given number or percentage of low availability items), a total number of orders placed in a subsequent period, etc.

In some embodiments, the online concierge system may run an AB test with various caps to obtain data points to plot the curve of perceived utility versus the amount of low availability items shown in the user interface. A maximum or a local maximum may be determined based on the curve. Once this maximum is determined, the online concierge system applies this maximum as a cap for showing subsequent lists of items, where no more than the capped limit of low availability items are shown.

As such, the online concierge system described herein dynamically presents each user with a user interface showing a proper amount of low availability items based on the user's query, providing the user better shopping experience. Additional details about the optimization of item availability prompts in the context of non-deterministic inventory data are further discussed below.

System Architecture

Figure 1:
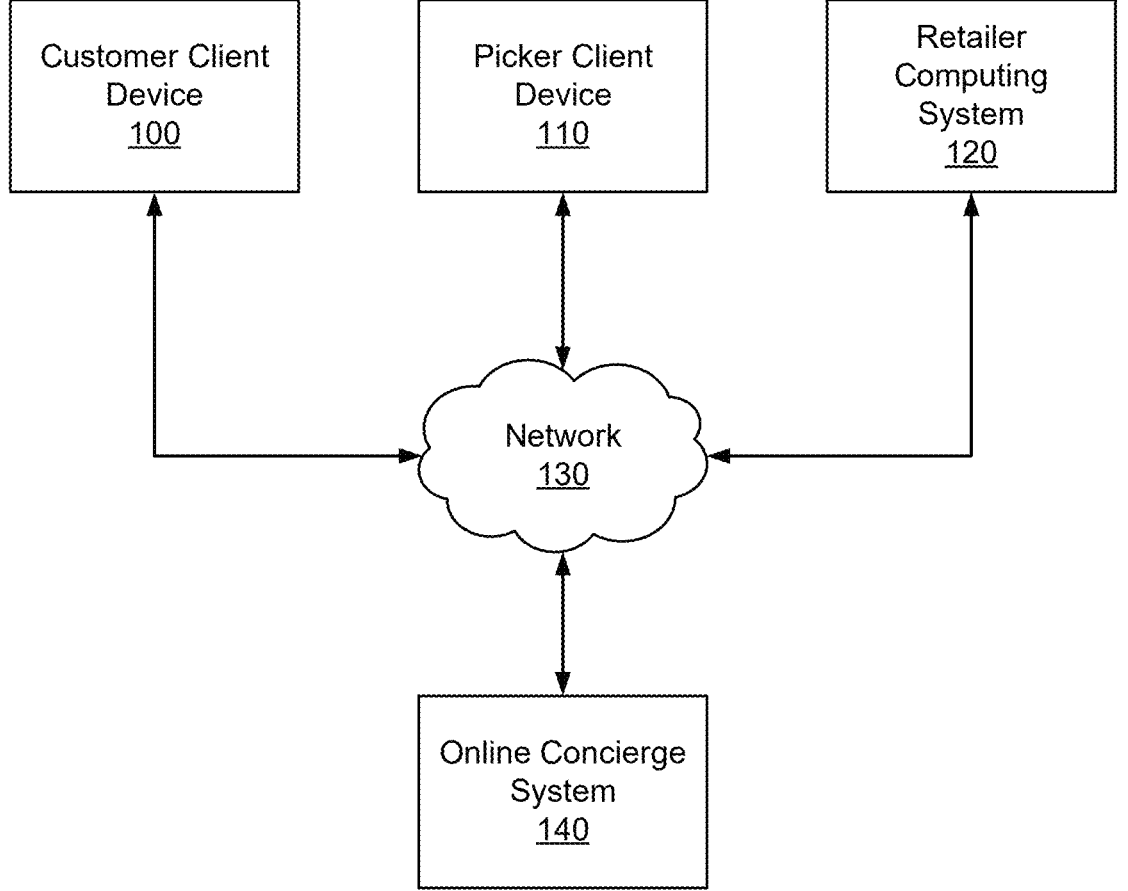
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140, and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online concierge system 140 by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Online Concierge System Overview

Figure 2:
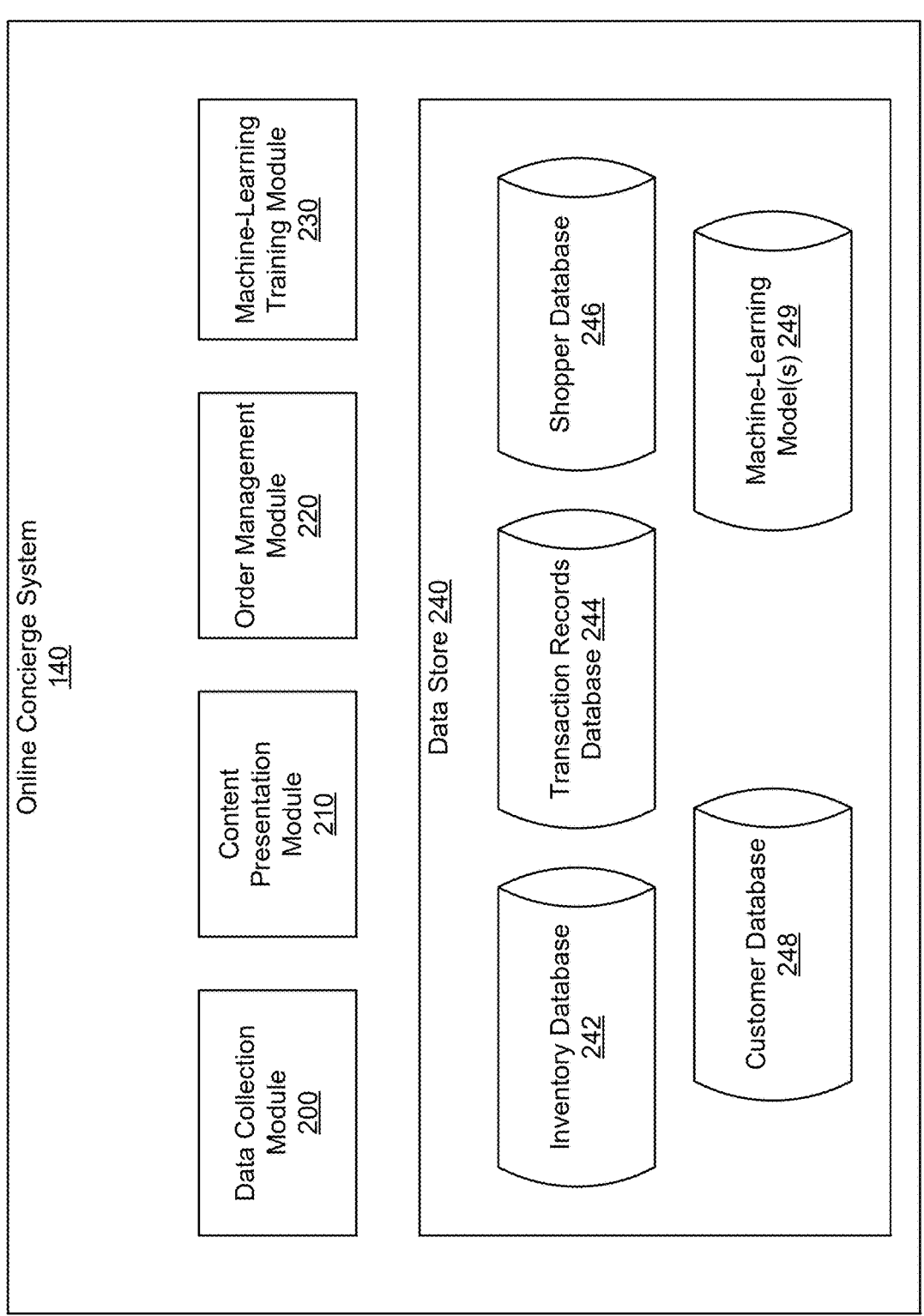
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data collected and/or used by the online concierge system 140. For example, the data store 240 may include an inventory database 242 that stores inventory data, a transaction records database 244 that stores transactions or orders and their status, a shopper database 246 that stores shopper data, and/or a customer database 248 that stores customer data for use by the online concierge system 140. In some embodiments, the data store 240 also stores trained machine learning models 249 trained by the machine learning training module 230. For example, the data store 240 may store the set of parameters for a trained machine learning model on one or more non-transitory, computer-readable media. The data store 240 uses computer-readable media to store data, and may use databases to organize the stored data.

Machine Learning Item Availability Model

Figure 3A:
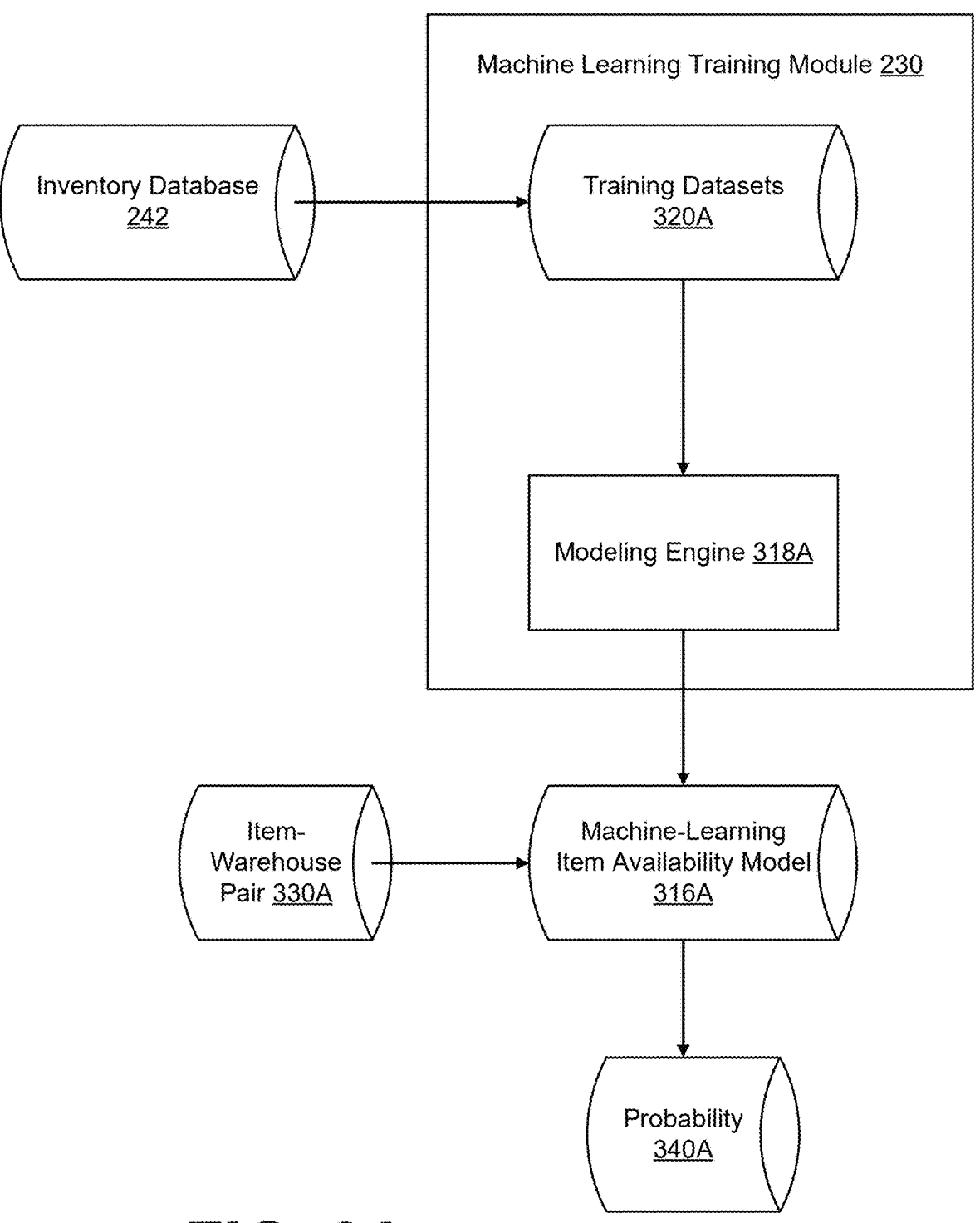
FIG. 3A illustrates an example embodiment of a machine learning training model for training an item availability model, in accordance with one or more embodiments.

FIG. 3A illustrates an example embodiment of machine learning training model 230. The machine learning training module 230 includes a modeling engine 318A and training datasets 320A. The modeling engine 318A uses the training datasets 320A to train a machine learning item availability model 316A. The machine learning item availability model 316A can learn from the training datasets 320A, rather than follow only explicitly programmed instructions. The online concierge system 140 can use the machine learning item availability model 316A to determine a probability that an item is available at a warehouse. The machine learning item availability model 316A may be used to predict item availability for items being displayed to or selected by a user or included in received delivery orders. The machine learning item availability model 316A is used to predict the availability of any number of items.

The machine learning item availability model 316A can be configured to receive as inputs information about an item, the warehouse for picking the item, and the time for picking the item. The machine learning item availability model 316A may be adapted to receive any information that the modeling engine 318A identifies as indicators of item availability. At minimum, the machine learning item availability model 316A receives information about an item-warehouse pair, such as an item in a delivery order and a warehouse at which the order could be fulfilled. Items and their corresponding warehouses stored in the inventory database 242 may be identified by item identifiers or warehouse identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 242. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 140 can extract information about the item and/or warehouse from the inventory database 242 and/or warehouse database and provide this extracted information as inputs to the item availability model 316A.

The machine learning item availability model 316A contains a set of functions generated by the modeling engine 318A from the training datasets 320A that relate the item, warehouse, and timing information, and/or any other relevant inputs, to the probability that the item is available at a warehouse. Thus, for a given item-warehouse pair 330A, the machine learning item availability model 316A outputs a probability 340A that the item is available at the warehouse. The machine learning item availability model 316A constructs the relationship between the input item-warehouse pair, timing, and/or any other inputs and the availability probability (also referred to as "availability") that is generic enough to apply to any number of different item-warehouse pairs. In some embodiments, the probability output by the machine learning item availability model 316A includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day.

The training datasets 320A relate a variety of different factors to known item availabilities from the outcomes of previous delivery orders (e.g., if an item was previously found or previously unavailable). The training datasets 320A include the items included in previous delivery orders, whether the items in the previous delivery orders were picked, warehouses associated with the previous delivery orders, and a variety of characteristics associated with each of the items (which may be obtained from the inventory database 242). Each piece of data in the training datasets 320A includes the outcome of a previous delivery order (e.g., if the item was picked or not). The item characteristics may be determined by the machine learning item availability model 316A to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine learning item availability model 316A may weight these factors differently, where the weights are a result of a "learning" or training process on the training datasets 320A. The training datasets 320A are very large datasets taken across a wide cross section of warehouses, shoppers, items, warehouses, delivery orders, times, and item characteristics. The training datasets 320A are large enough to provide a mapping from an item in an order to a probability that the item is available at a warehouse. In addition to previous delivery orders, the training datasets 320A may be supplemented by inventory information provided by the online concierge system 140. In some examples, the training datasets 320A are historic delivery order information used to train the machine learning item availability model 316A, whereas the inventory information stored in the inventory database 242 include factors input into the machine learning item availability model 316A to determine an item availability for an item in a newly received delivery order. In some examples, the modeling engine 318A may evaluate the training datasets 320A to compare a single item's availability across multiple warehouses to determine if an item is chronically unavailable. This may indicate that an item is no longer manufactured. The modeling engine 318A may query a warehouse through the online concierge system 140 for updated item information on these identified items.

The training datasets 320A include a time associated with previous delivery orders. In some embodiments, the training datasets 320A include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320A include a day of the week previous delivery orders were placed. The day of the week may impact item availability since popular shopping days may have reduced inventory of items or restocking shipments may be received on particular days. In some embodiments, training datasets 320A include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320A include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320A may also include a rate at which an item is typically found by a shopper at a warehouse, a number of days since inventory information about the item was last received from the online concierge system 140, a number of times an item was not found in a previous week, or any number of additional rate or time information. The relationships between this time information and item availability are determined by the modeling engine 318A training a machine learning model with the training datasets 320A, producing the machine learning item availability model 316A.

The training datasets 320A include item characteristics. In some examples, the item characteristics include a department associated with the item. For example, if the item is yogurt, it is associated with the dairy department. The department may be the bakery, beverage, nonfood, pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently restocked than others. Additionally, or alternatively, the item characteristics include an item popularity score. The item popularity score for an item may be proportional to the number of delivery orders received that include the item. An alternative or additional item popularity score may be provided by a retailer through the online concierge system 140. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and restocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318A training a machine learning model with the training datasets 320A, producing the machine learning item availability model 316A.

The training datasets 320A may include additional item characteristics that affect the item availability and can therefore be used to build the machine learning item availability model 316A relating the delivery order for an item to its predicted availability. The training datasets 320A may be periodically updated with recent delivery orders. The training datasets 320A may be updated with item availability information provided directly from shoppers. The training datasets 320A may also be updated based on the updated inventory database 242. Following updating of the training datasets 320A, a modeling engine 318A may retrain a model with the updated training datasets 320A.

The set of functions of the item availability model 316A may be updated and adapted following retraining with new training datasets 320A. In some embodiments, the retraining of the machine learning item availability model 316A may be performed periodically at a predetermined frequency, such as every year, every three months, every month, etc. In some embodiments, the retraining of the machine learning item availability model 316A may be performed in response to determining that a threshold number of records in the inventory database 242 has changed, e.g., 10% of the records are changed. In some embodiments, the retraining of the machine learning item availability model 316A may be performed in response to determining that the overall performance of the existing item availability model 316A deteriorates to a predetermined threshold, e.g., an overall correct prediction is lower than a predetermined threshold, such as 90%.

Machine Learning Item Replacement Model

Figure 3B:
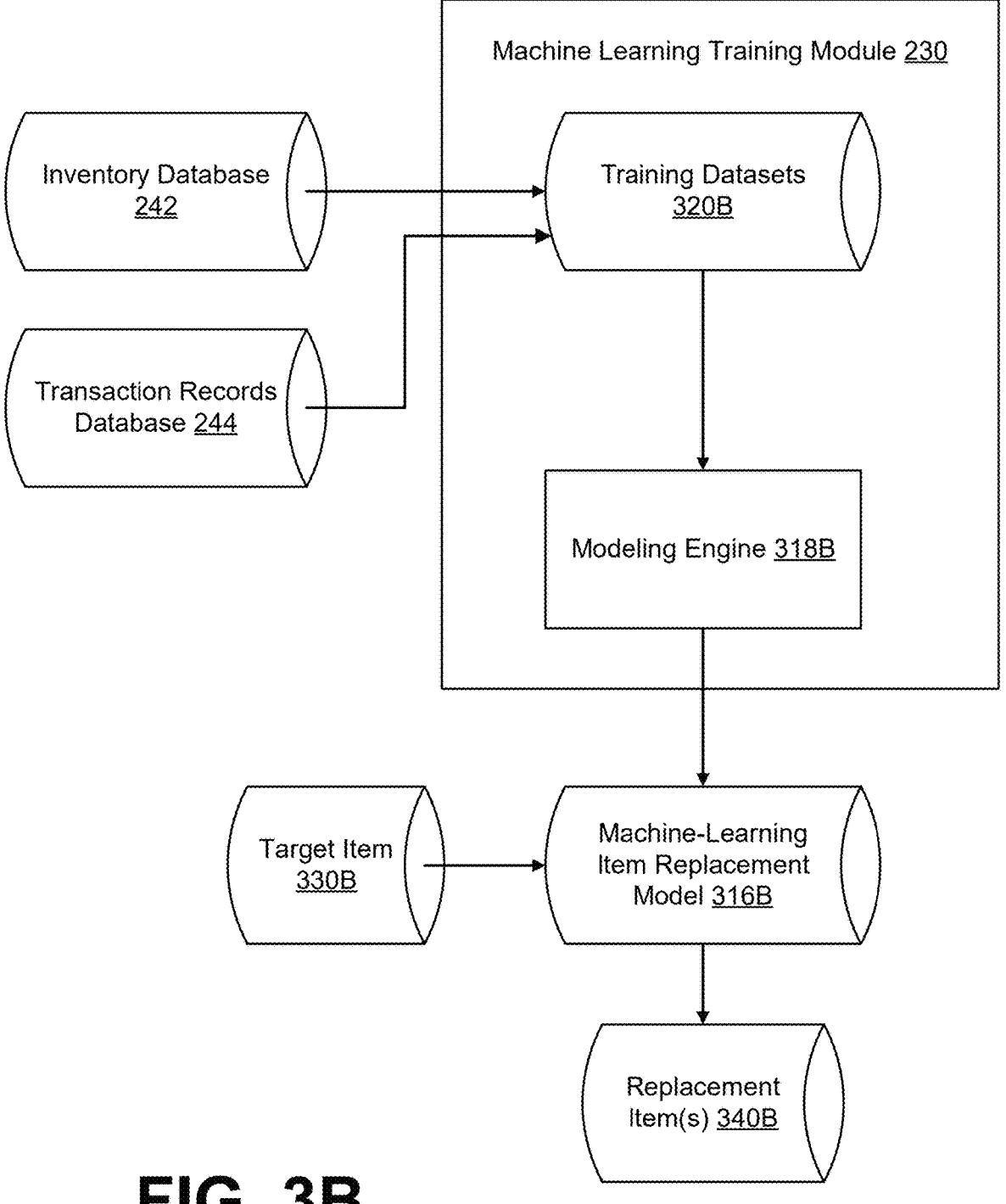
FIG. 3B illustrates another example embodiment of a machine learning training model for training an item replacement model, in accordance with one or more embodiments.

FIG. 3B illustrates another example embodiment of machine learning training model 230 including a modeling engine 318B and training dataset 320B. The modeling engine 318B uses the training dataset 320B to train a machine learning item replacement model 316B. The machine learning item replacement model 316B can learn from the training datasets 320B, rather than follow only explicit programmed instructions. The online concierge system 140 can use the machine learning item replacement model 316B to select one or more replacement items for a given low availability item or out of stock item.

In some embodiments, the machine learning item availability model 316B can be trained to receive as input information about a target item 330B (e.g., a low availability item or an out of stock item) to output one or more replacement items 340B that may be used to replace the target item 330B. The machine learning item availability model 316B may be adapted to receive any information that the modeling engine 318B identifies as an indicator of item replacement. Such information may include (but is not limited to) similarity between the target item and a candidate item (such as categories of the target item and the candidate item, descriptions of the target item and the candidate item, ingredients of the target item and the candidate item, etc.), which may be extracted from the inventory database 242. Such information may also include (but is not limited to) previously accepted replacement items for the target item based on historical orders, which may be extracted from the transaction records database 244.

The machine learning item replacement model 316B may contain a set of functions generated by the modeling engine 318B from the training dataset 320B that relate different items. In some embodiments, for a given target item 330B, the machine learning item replacement model 316B outputs a probability that a candidate item is accepted by a customer as a replacement item for the target item. In some embodiments, the probability output by the machine learning item replacement model 316B includes a confidence score. The confidence score may be the error or uncertainty score of the output replacement probability and may be calculated using any statistical error measurement. In some embodiments, the confidence score is based in part on a similarity between the target item and the candidate item. Alternatively, or in addition, the confidence score is based in part on whether the candidate item was accepted by a customer in a historical order. In some embodiments, the machine learning item replacement model 316B sets a threshold probability, and only the items with a probability greater than the threshold probability are output as replacement items 340B.

The set of functions of the item replacement model 316B may be updated and adapted following retraining with new training datasets 320B. The new training datasets 320B may be obtained from the updated inventory database 242 and/or transaction records database 244. In some embodiments, the retraining of the machine learning item replacement model 316B may be performed periodically at a predetermined frequency, such as every year, every three months, every month, etc. In some embodiments, the retraining of the machine learning item replacement model 316B may be performed in response to determining that a threshold number of records in the inventory database 242 or transaction record database 244 has changed, e.g., 10% of the records are changed. In some embodiments, the retraining of the machine learning item replacement model 316B may be performed in response to determining that the overall performance of the existing item replacement model 316B deteriorates to a predetermined threshold, e.g., an overall correct prediction is lower than a predetermined threshold, such as 90%.

The machine learning item replacement model 316B or the machine learning item replacement model 316B may be any machine learning model, such as a neural network, boosted tree, gradient boosted tree, or random forest model. In some embodiments, the machine learning item availability model 316A or machine learning item replacement model 316B is generated from XGBoost algorithm.

Customer Application

FIG. 4A is a diagram of the customer application 400A, according to one or more embodiments. The customer application 400A may be a web application and/or a mobile application. The customer application 400A includes an ordering interface 402, which provides an interactive interface with which the user can browse through and select products and place an order. The customer application 400A also includes a system communication interface 404 which, among other functions, receives inventory information from the online concierge system 140 and transmits order information to the online concierge system 140. The customer application 400A also includes a preferences management interface 406 which allows the user to manage basic information associated with his/her account, such as his/her home address and payment instruments. The preferences management interface 406 may also allow the user to manage other details such as his/her favorite or preferred warehouses, preferred delivery times, special instructions for delivery, and so on.

Picker Application

FIG. 4B is a diagram of the picker application 400B, according to one or more embodiments. The picker application 400B may be a web application or a mobile application. The picker application 400B includes a barcode scanning module 420 which allows a shopper to scan an item at a warehouse (such as a can of soup on the shelf at a grocery store). The barcode scanning module 420 may also include an interface which allows the shopper to manually enter information describing an item (such as its serial number, SKU, quantity and/or weight) if a barcode is not available to be scanned. Picker application 400B also includes a basket manager 422 which maintains a running record of items collected by the shopper for purchase at a warehouse. This running record of items is commonly known as a "basket." In one or more embodiments, the barcode scanning module 420 transmits information describing each item (such as its cost, quantity, weight, etc.) to the basket manager 422, which updates its basket accordingly. The picker application 400B also includes a system communication interface 424 which interacts with the online concierge system 140. For example, the system communication interface 424 receives an order from the online concierge system 140 and transmits the contents of a basket of items to the online concierge system 140. The picker application 400B also includes an image encoder 426 which encodes the contents of a basket into an image. For example, the image encoder 426 may encode a basket of goods (with an identification of each item) into a QR code which can then be scanned by an employee of the warehouse at check-out.

Optimization of Item Availability Prompts

In various embodiments, the online concierge system enables a user to search for and purchase items from one or more warehouses, such as retail stores. A user may find items available at a warehouse by browsing for them in a user interface of the online concierge system 140, by inputting a search query in a search interface of the system and viewing a search results user interface, or any other suitable interface for finding items for sale. When the online concierge system 140 generates the user interface, it determines a list of items to populate in the user interface from which the user can select and purchase.

To determine the list of items to populate in the user interface, the online concierge system 140 first identifies a list of candidate items that are responsive to a context in which the user is using the system. For example, if the user has provided a search query, the list of candidate items may be a list of items that match the search query and are offered from a warehouse or store that has been selected by the user. Alternatively, if the user is browsing a category or department of the warehouse, the online concierge system 140 may obtain a list of candidate items that are within the relevant category (e.g., in a taxonomy of items).

The online concierge system 140 then determines if the candidate items are in stock. For example, the online concierge system 140 may apply the trained machine learning item availability model to each of the candidate items, where the model outputs a likelihood that the warehouse has the item in stock or that a picker will successfully locate the item in the warehouse. In various embodiments, the models output a probability between 0% and 100% that the item can be found. The online concierge system 140 may categorize the items into different classes of availability.

Figure 5:
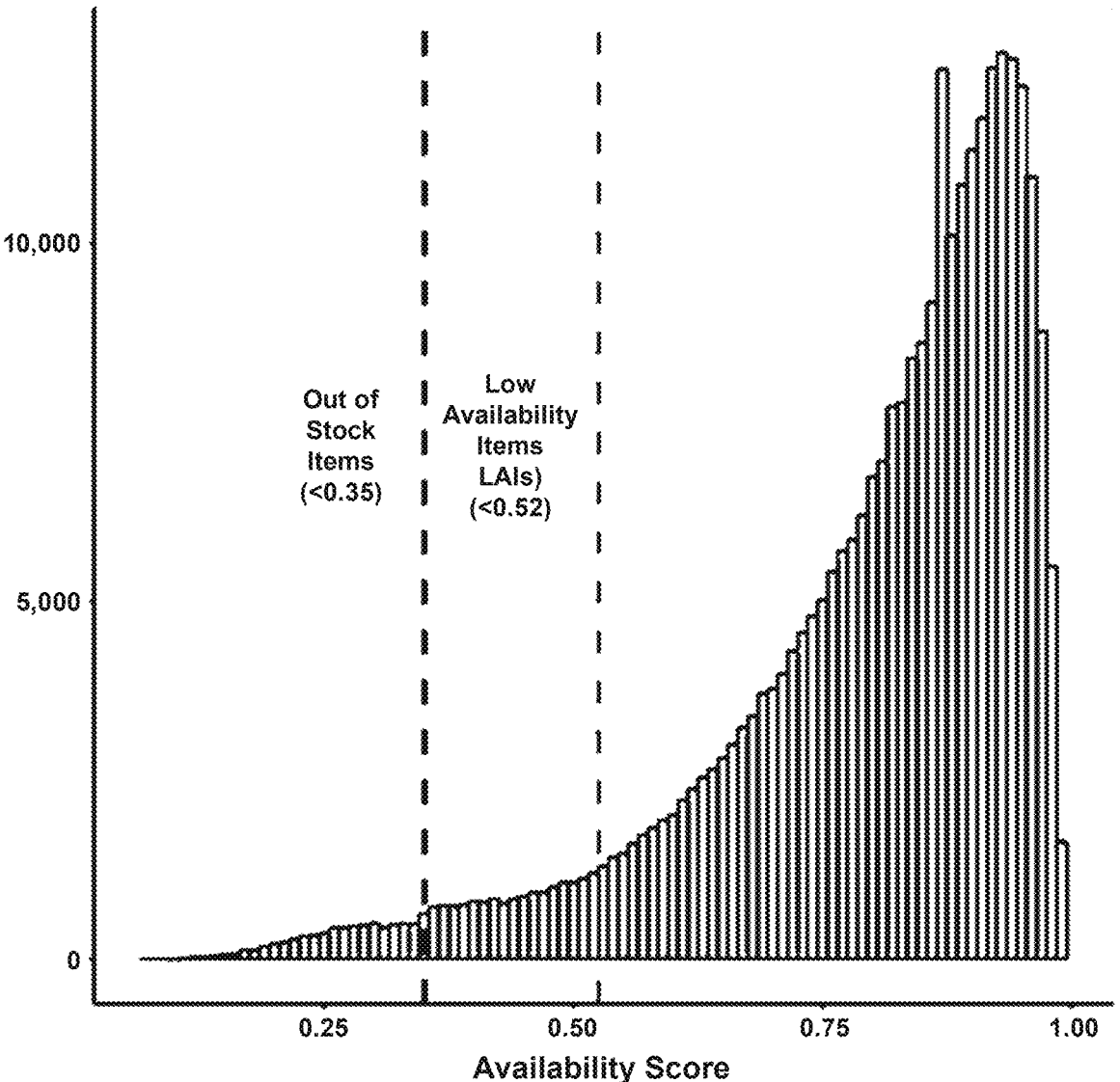
FIG. 5 is a histogram of item availability scores for a plurality of items by their availability scores across the x-axis, in accordance with one or more embodiments.

FIG. 5 shows a histogram of item availability scores for a plurality of items by their availability scores across the x-axis. The items having an availability score below a lower threshold (e.g., 35%) are classified as "out of stock," the items above that lower threshold but below a higher threshold (e.g., 52%) are classified as low availability items, and the items above the higher threshold are classified as "available." Because the "out of stock" items are unlikely to be found, the online concierge system 140 does not present these items to the user in the user interface. Because the "available" items are likely available, the online concierge system 140 presents these items to the user in the user interface. For the low availability items, the system may show some or a subset of them to the user, since there is a more significant chance that the user will not be able to acquire those items. For example, in some cases, they online concierge system 140 selects a number of these low availability items and displays the selected number of low availability items to the user. The number of low availability items may be determined based on a user utility curve modeled based on a metric correlated with user utility and an amount of low availability items presented.

Figures 6A, 6B:
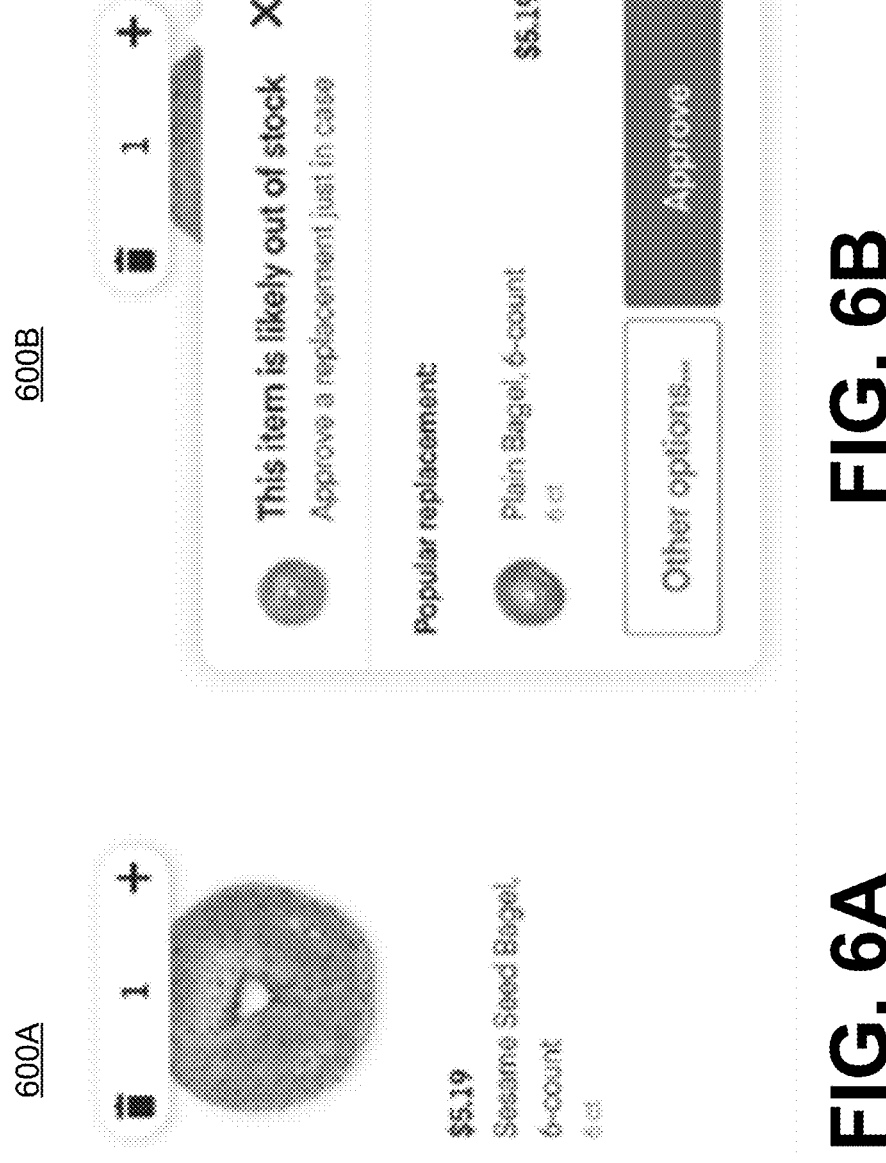
FIGS. 6A and 6B illustrate example graphical user interfaces (GUIs), in accordance with one or more embodiments.

In some embodiments, the online concierge system 140 may show a message next to low availability items indicating that the items may be out of stock, and potentially providing an interface for selecting substitute items in advance. FIGS. 6A and 6B illustrate example graphical user interfaces (GUIs) 600A and 600B. GUI 600A shows an item (e.g., a bagel) is available. GUI 600B shows an item (e.g., a bagel) is likely out of stock, while at the same time offering a replacement recommendation to the user. In this manner, the customer experience is designed to serve the complementary goals of better setting customer expectations while facilitating the collection of customer-approved replacements to be acted upon should the item end up being out of stock.

Applicant conducted extensive research and experiment and discovered that showing some or all of the low availability items may lead to a better user experience (balancing the chance of disappointment for not finding the items versus the possibility of obtaining an item that is desired). However, showing too many low availability items, or too high a proportion of low availability items, in the user interface may actually degrade the user's experience, in part, due to a lack of confidence in the online concierge system. Users' experiences may be measured by user actions subsequent to the amount of low availability items presented to the users. Such user actions may include (but are not limited to) an amount of items placed in an order, an user interaction with a low availability item (e.g., adding a low availability item in the shopping cart, selecting a replacement item for the low availability item placed in the shopping cart), etc.

In some embodiments, the online concierge system 140 models the user's perceived utility of the service using a measurable metric that is expected to correlate with the users perceived utility, such as the total amount of money spent in a subsequent period (subsequent to the presentation of a user interface with a given number or percentage of low availability items), a total number of orders placed in a subsequent period, etc. In some embodiments, the online concierge system 140 may run an AB test with various caps to obtain data points to plot the curve of perceived utilities versus amounts of low availability items shown in the user interface. A local maximum may then be determined based on the curve. Once this maximum is determined, the online concierge system applies this maximum as a cap for showing subsequent lists of items, where no more than the capped limit of low availability items are shown.

Figure 7:
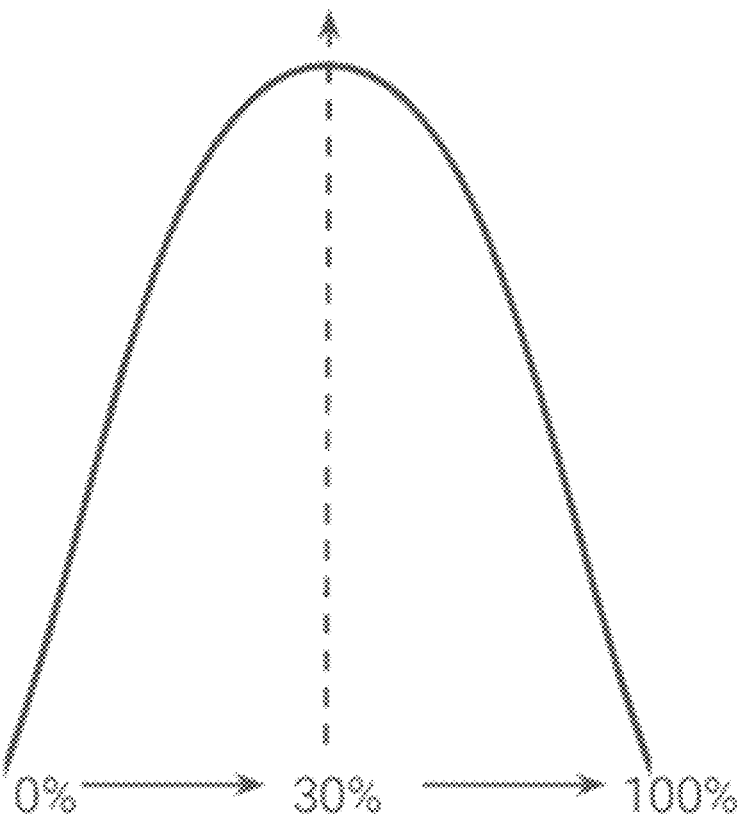
FIG. 7 shows a graph of user experience, or user "utility" as a function of the low availability items that are presented to the user, in accordance with one or more embodiments.

FIG. 7 shows a graph of user experience, or user "utility" as a function of the low availability items that are presented to the user (in this case, plotted as a percentage of the items shown that are low availability). This curve of user perceived utility of the online concierge system 140 initially increases as some low availability items are included in the user interface. However, as this number increases, the perceived utility peaks and then starts to decline. Under these circumstances, there exists a maximum number or percentage of low availability items that can maximize the user's perceived utility. In the example graph, this maximum is 30%, meaning that no more than 30% of the items shown in the user interface should be "low availability," or the user's experience will suffer. Therefore, the online concierge system 140 determines this maximum amount of low availability items and caps the number of low availability items at this maximum. If the candidate items do not contain more than this cap, then the online concierge system 140 will show all of the low availability items; otherwise, the online concierge system 140 will cap the number of low availability items in the user interface at this number. Accordingly, the online concierge system 140 determines how many of the "low availability items to show in the user interface, before the user experience starts to degrade.

The online concierge system may divide the user population into different demographic groups, or otherwise into groups, where the groups are suspected of having a different utility curve. In such a case, the online concierge system 140 may determine the utility curve for these different groups and then determine and apply a different cap based on the different utility curves.

FIG. 8 is a flowchart for a method 800 of presenting a combination of available items and low availability items to a user, in accordance with some embodiments. Alternative embodiments may include more, fewer, or different steps from those illustrated in FIG. 8, and the steps may be performed in a different order from that illustrated in FIG. 8. These steps may be performed by an online concierge system (e.g., online concierge system 140). Additionally, each of these steps may be performed automatically by the online concierge system without human intervention.

The online concierge system 140 receives 810 a request for a set of items at a warehouse from a user device. In some embodiments, the request includes a search query from the user device. In some embodiments, the request includes a request to browse a category of items from the user device.

The online concierge system 140 determines 820 a set of candidate items responsive to the request. In some embodiments, the online concierge system 140 passes the query to the inventory database 242 and causes the inventory database 242 to return a query result based on the query. The query result includes the set of candidate items.

The online concierge system 140 applies 830 a trained item availability model (e.g., item availability model 316A) to each item in the set of candidate items. The item availability model 316A receives information about each candidate item and outputs a prediction of a likelihood that the candidate item is available for pickup at the warehouse. The information about candidate items received by the item availability model may include any information that the modeling engine 318A identifies as indicative of item availability. At minimum, the item availability model receives information about an item-warehouse pair, such as an identifier of an item and an identifier of a warehouse at which the order is to be fulfilled. In some embodiments, additional information, such as (but not limited to) a time that the item was last found in the warehouse, a time that the item was last not found in the warehouse, the rate at which the item is found, the popularity of the time, may also be used by the item availability model.

The online concierge system 140 classifies 840 a subset of candidate items that have a prediction below a threshold as low availability. For example, as shown in FIG. 5, the threshold for low availability is set at 0.5. In some embodiments, there are more than one threshold, namely an out of stock threshold (e.g., 0.35), and a low availability threshold (e.g., 0.5). When an item availability score is below the out of stock threshold, the online concierge system 140 classifies that item as out of stock. When an item availability score is between the out of stock threshold and the low availability threshold, the online concierge system 140 classifies that item as low availability.

The online concierge system 140 determines 850 a cap of low availability items to present to a user based on a user utility curve. The user utility curve models as a metric correlated with user utility as a function of an amount of low availability items presented. The cap is based on a local maximum of the user utility curve. In some embodiments, the online concierge system 140 generates the user utility curve by presenting different amounts of low availability items to users, and determines a user utility curve based on user actions responsive to viewing the different amounts of low availability items.

In some embodiments, users are divided into multiple groups, and the online concierge system 140 presents different amounts of low availability items to different groups of users, determines a user utility for each group of users based on user actions responsive to viewing the corresponding amount of low availability items, and generates the user utility curve based on the determined user utility for each group of users. The online concierge system 140 determines which group the user belongs to, and uses the curve corresponding to the group.

In some embodiments, the user utility is measured based on an amount of items placed in an order subsequent to the presentation of the amount of low availability items. The amount of items may be measured based on a total number of items placed. Alternatively, or in addition, the amount of items may be measured based on a total value of items placed. For example, FIG. 7 illustrates an example of a user utility curve 700 having a cap of 30%, indicating that an optimal ratio between an amount of low availability items and available items is 30%.

The online concierge system 140 filters 860 the subset of candidate items so that an amount of candidate items classified as low availability is within the determined cap. For example, as shown in FIG. 7, when the cap is 30%, the online concierge system 140 filters the subset of candidate items so that a ratio between an amount of low availability items and an amount of available items is within 30%. In some embodiments, the online concierge system 140 sorts the predicted likelihood that each candidate item is available for pickup at the warehouse. The candidate items with lower predicted likelihoods are filtered out. In some embodiments, the online concierge system 140 determines the ratio between the amount of low availability items and the amount of available items. If the ratio is lower than the cap, all the low availability items are presented to the user. Only when the ratio is greater than the cap, the low availability items are filtered based on their predicted likelihoods.

The online concierge system 140 sends 870 the filtered candidate items to the user device for presentation in a user interface. For example, if the cap of low availability items is 30%, the online concierge system 140 determines a total number of available items (e.g., 10), and a total number of low availability items (e.g., 8) in the candidate items. The online concierge system 140 determines a ratio between the total number of low availability items and the total number of available items (e.g., 80%=8/10). Responsive to determining that the ratio (e.g., 80%) is greater than the cap (e.g., 30%), the online concierge system 140 determines a number of candidate items that are to be presented based on the number of available items and cap (e.g., 3=10×30%). Only the determined number of candidate items (e.g., 3) are to be presented to the user (in addition to the available items). The three low availability items may be selected randomly, or based on one or more predetermined rules. In some embodiments, the online concierge system 140 sorts the low availability items based on their predicted likelihoods, selects the top three low availability items and sends the selected three low availability items to the user device for presentation in the user interface. In this case, a total of 13 items (10 available items and 3 low availability items) are presented to the user.

If the ratio between the total number of low availability items and the total number of available items is lower than the cap, e.g., if the total number of low availability items is 2, and the total number of available items is 10, resulting in the ratio as 20% lower than the cap 30%, all the low availability items are presented to the user.

In some embodiments, the online concierge system 140 further selects one or more replacement items for a pre-sented low availability item (also referred to as a "target low availability item"). In some embodiments, the selection of the replacement item includes using a trained item replacement model (e.g., machine learning item replacement model 316B) to take information describing the target low availability time to output one or more candidate replacement items. The online concierge system 140 may further filter the one or more candidate replacement items based on their likelihood of being available. In some embodiments, the online concierge system selects only the candidate replacement items that are classified as available. In some embodiments, the online concierge system 140 selects candidate replacement items that are more likely to be available than the target low availability item; thus, the selected replacement items may or may not be a low availability item. In some cases, none of the candidate replacement items has a greater likelihood of being available than the target low availability item. In such a case, the online concierge system 140 may still select one or more candidate replacement items with highest availabilities.

ADDITIONAL CONSIDERATIONS

The foregoing description of the embodiments has been presented for the purpose of illustration; many modifications and variations are possible while remaining within the principles and teachings of the above description.

Any of the steps, operations or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method implemented at a computer system comprising a processor and a computer-readable medium, the method comprising:

receiving, by an online system, a request for a set of items at a warehouse from a user device;

determining a set of candidate items responsive to the request;

applying a trained item availability model to each item in the set of candidate items, the item availability model outputting a prediction of a likelihood that the candidate item is available for pickup at the warehouse;

classifying a first subset of candidate items that have a prediction below a threshold as low availability;

for a first user, analyzing historical first user data to generate a first user utility curve that models a relationship between a quantity or proportion of low availability items previously presented to the first user and a corresponding utility metric derived from the first user data, the utility metric indicating a level of the first user's engagement with the online system;

determining a first local maximum of the first user utility curve;

determining, based on the first local maximum of the first user utility curve, a first cap on a first number of low availability items that are shown to the first user in a first user interface;

modifying a layout of items in the first user interface based on the determined first cap, such that items with predicted availability below the first cap are visually deprioritized; and sending the layout of items to a first device associated with the first user for presentation in the first user interface, wherein sending the layout of items to the first device for presentation in the first user interface causes the first device to present the layout of items in the first user interface; and for a second user, different from the first user, analyzing historical second user data to generate a second user utility curve that models a relationship between a quantity or proportion of low availability items previously presented to the second user and a corresponding utility metric derived from the second user data, the utility metric indicating a level of the second user's engagement with the online system;

determining a second local maximum of the second user utility curve, the second local maximum being different from the first local maximum;

determining, based on the second local maximum of the second user utility curve, a second cap on a second number of low availability items that are shown to the second user in a second user interface, the second cap being different from the first cap;

modifying a layout of items in the second user interface based on the determined second cap, such that items with predicted availability below the second cap are visually deprioritized; and sending the layout of items to a second device associated with the second user for presentation in the second user interface, wherein sending the layout of items to the second device for presentation in the second user interface causes the second device to present the layout of items in the second user interface, and wherein the first user interface and the second user interface are customized for the respective first user and second user, the first user interface and the second user interface being different from each other.

2. The method of claim 1, wherein receiving a request comprises receiving a search query from the user device.

3. The method of claim 1, wherein receiving a request comprises receiving a request to browse a category of items from the user device.

4. The method of claim 1, further comprising:

classifying a second subset of candidate items that have a prediction above the threshold as high availability, wherein the layout of items is modified further based on the first subset of items and the second subset of items.

5. The method of claim 4, further comprising:

determining an amount of items in the first subset; and determining an amount of items in the second subset, wherein the layout of items is modified further based on a ratio between the amount of items in the first subset and the amount of items in the second subset.

6. The method of claim 5, wherein the user utility curve is modeled as a metric correlated with user utility as a function of an amount of low availability items presented and an amount of high availability items presented.

7. The method of claim 6, wherein the user utility curve is modeled as a metric correlated with user utility as a ratio between the amount of low availability items presented and the amount of high availability items presented.

8. The method of claim 6, wherein responsive to determining that a ratio between the amount of low availability items and the amount of high availability items is below a threshold ratio, presenting all the low availability items.

9. The method of claim 4, further comprising:

classifying a third subset of items that have a prediction below a second threshold that is lower than the threshold as out of stock, wherein the layout of items is further based on the third subset of items.

10. The method of claim 1, wherein determining a cap of low availability items to present to a user based on a user utility curve comprises:

presenting different amounts of low availability items to different groups of users;

determining a user utility for each group of users based on user actions responsive to viewing a corresponding amount of low availability items; and generating the user utility curve based on the determined user utility for each group of users.

11. The method of claim 1, wherein there are a plurality of user utility curves, corresponding to a plurality of groups of users, and the method further comprises:

identifying a group from the plurality of groups that the user belongs to;

selecting a user utility curve from the plurality of user utility curves corresponding to the group that the user belongs to; and determining the cap of low availability items to present to the user based on the selected user utility curve.

12. The method of claim 10, wherein determining the user utility for each group of users comprises:

for each user in a group, determining a metric indicating utility perceived by the user based in part on an amount of items placed in an order subsequent to the presentation of the amount of low availability items.

13. The method of claim 1, the method further comprising:

sorting the predicted likelihood that each candidate item is available for pickup at the warehouse, the layout of items is further based on sorting of the predicted likelihood that each candidate item is available for pick up at the warehouse.

14. The method of claim 1, further comprising:

for at least one filtered candidate item, selecting a replacement item that is not a low availability item; and causing the replacement to be displayed in the user interface as a suggested replacement in case the filtered candidate item is not available.

15. A non-transitory computer-readable medium having instructions encoded thereon that, when executed by a processor, cause the processor to perform steps comprising:

receiving, by an online system, a request for a set of items at a warehouse from a user device;

determining a set of candidate items responsive to the request;

applying a trained item availability model to each item in the set of candidate items, the item availability model outputting a prediction of a likelihood that the candidate item is available for pickup at the warehouse;

classifying a first subset of items that have a prediction below a threshold as low availability;

for a first user, analyzing historical first user data to generate a first user utility curve that models a relationship between a quantity or proportion of low availability items previously presented to the first user and a corresponding utility metric derived from the first user data, the utility metric indicating a level of the first user's engagement with the online system;

determining a first local maximum of the first user utility curve;

determining, based on the first local maximum of the first user utility curve, a first cap on a first number of low availability items that are shown to the first user in a first user interface;

modifying a layout of items in the first user interface based on the determined first cap, such that items with predicted availability below the first cap are visually deprioritized; and sending the layout of items to a first device associated with the first user for presentation in the first user interface, wherein sending the layout of items to the first device for presentation in the first user interface causes the first device to present the layout of items in the first user interface; and for a second user, different from the first user, analyzing historical second user data to generate a second user utility curve that models a relationship between a quantity or proportion of low availability items previously presented to the second user and a corresponding utility metric derived from the second user data, the utility metric indicating a level of the second user's engagement with the online system;

determining a second local maximum of the second user utility curve, the second local maximum being different from the first local maximum;

determining, based on the second local maximum of the second user utility curve, a second cap on a second number of low availability items that are shown to the second user in a second user interface, the second cap being different from the first cap;

modifying a layout of items in the second user interface based on the determined second cap, such that items with predicted availability below the second cap are visually deprioritized; and sending the layout of items to a second device associated with the second user for presentation in the second user interface, wherein sending the layout of items to the second device for presentation in the second user interface causes the second device to present the layout of items in the second user interface, and wherein the first user interface and the second user interface are customized for the respective first user and second user, the first user interface and the second user interface being different from each other.

16. The non-transitory computer-readable medium of claim 15, further comprising instructions encoded thereon that, when executed by a processor, cause the processor to perform steps comprising:

classifying a second subset of items that have a prediction above the threshold as high availability, wherein the layout of items is modified further based on the first subset of items and the second subset of items.

17. The non-transitory computer-readable medium of claim 16, further comprising instructions encoded thereon that, when executed by a processor, cause the processor to perform steps comprising:

determining an amount of items in the first subset; and determining an amount of items in the second subset, wherein the layout of items is modified further based on a ratio between the amount of items in the subset and the amount of items in the second subset.

18. The non-transitory computer-readable medium of claim 17, further comprising instructions encoded thereon that, when executed by a processor, cause the processor to perform steps comprising:

classifying a third subset of items that have a prediction below a second threshold that is lower than the threshold as out of stock, wherein the layout of items is further based on the third subset of items.

19. The non-transitory computer-readable medium of claim 15, wherein determining a cap of low availability items to present to a user based on a user utility curve comprises:

presenting different amounts of low availability items to different groups of users;

determining a user utility for each group of users based on user actions responsive to viewing a corresponding amount of low availability items; and generating the user utility curve based on the determined user utility for each group of users.

20. A computer system comprising:

a processor; and a non-transitory computer-readable medium having instructions encoded thereon that, when executed by the processor, cause the processor to perform steps comprising:

receiving a request for a set of items at a warehouse from a user device;

determining a set of candidate items responsive to the request;

applying a trained item availability model to each item in the set of candidate items, the item availability model outputting a prediction of a likelihood that the candidate item is available for pickup at the warehouse;

classifying a subset of items that have a prediction below a threshold as low availability;

for a first user, analyzing historical first user data to generate a first user utility curve that models a relationship between a quantity or proportion of low availability items previously presented to the first user and a corresponding utility metric derived from the first user data, the utility metric indicating a level of the first user's engagement with the computer system;

determining a first local maximum of the first user utility curve;

determining, based on the first local maximum of the first user utility curve, a first cap on a first number of low availability items that are shown to the first user in a first user interface;

modifying a layout of items in the first user interface based on the determined first cap, such that items with predicted availability below the first cap are visually deprioritized; and sending the layout of items to a first device associated with the first user for presentation in the first user interface, wherein sending the layout of items to the first device for presentation in the first user interface causes the first device to present the layout of items in the first user interface; and for a second user, different from the first user, analyzing historical second user data to generate a second user utility curve that models a relationship between a quantity or proportion of low availability items previously presented to the second user and a corresponding utility metric derived from the second user data, the utility metric indicating a level of the second user's engagement with the online system;

determining a second local maximum of the second user utility curve, the second local maximum being different from the first local maximum;

determining, based on the second local maximum of the second user utility curve, a second cap on a second number of low availability items that are shown to the second user in a second user interface, the second cap being different from the first cap;

modifying a layout of items in the second user interface based on the determined second cap, such that items with predicted availability below the second cap are visually deprioritized; and sending the layout of items to a second device associated with the second user for presentation in the second user interface, wherein sending the layout of items to the second device for presentation in the second user interface causes the second device to present the layout of items in the second user interface, and wherein the first user interface and the second user interface are customized for the respective first user and second user, the first user interface and the second user interface being different from each other.

* * * * *